United States Patent [19]

Spevak

[11] Patent Number: 4,466,647
[45] Date of Patent: Aug. 21, 1984

[54] ANIMAL FECES DISPOSAL DEVICE

[76] Inventor: Sidney M. Spevak, 10916 New Hampshire Ave., Silver Spring, Md. 20903

[21] Appl. No.: 409,044

[22] Filed: Aug. 17, 1982

[51] Int. Cl.³ .............................................. A01K 29/00
[52] U.S. Cl. ................................... 294/1 BB; 294/100
[58] Field of Search ..................... 294/1 R, 1 B, 1 BA, 294/1 BB, 19 R, 55, 99 R, 100; 15/104.8, 257.1, 257.7; 248/99, 101

[56] References Cited

U.S. PATENT DOCUMENTS

| 3,467,116 | 9/1969 | Ringewaldt | 294/100 X |
| 3,716,263 | 2/1973 | Gatti | 294/1 BA |
| 3,733,099 | 5/1973 | Szita | 294/55 |
| 3,819,220 | 6/1974 | Bredt | 294/1 BB |

Primary Examiner—Johnny D. Cherry
Attorney, Agent, or Firm—Browdy and Neimark

[57] ABSTRACT

A device for catching dog feces to prevent soiling of city streets and sidewalks includes a telescoping wand having a pair of spring arms at the working end, which arms have clips thereon for releasably holding a conventional plastic bag.

4 Claims, 5 Drawing Figures

ANIMAL FECES DISPOSAL DEVICE

FIELD OF INVENTION

The present invention relates to improving the environment, and, more particularly, to an animal walker's tool which opens and unfolds a removable conventional bag for convenient, aesthetic, and sanitary disposal of animal feces.

BACKGROUND OF INVENTION

With the increasing number of urban and suburban households with pets, particularly dogs, local government authorities have enacted ordinances requiring owners of such pets to clean up after them in order to reduce pedestrian hazards and increase public enjoyment of outdoor recreational facilities.

Various devices have been designed or created to assist owners in cleaning up their pet's feces. However, such tools are for the most part unsanitary and only partially effective. These tools which include scoops for shoveling feces and tongs for grasping waste material need daily washing and leave the remainder of the animal's wastes still spread over the concrete surface of streets or walkways.

In U.S. Pat. No. 3,819,220 to Bredt, there is disclosed a sanitary device for pets having the configuration of a walking stick or cane in which a pair of spring arms are fixed to the lower end of a telescopic body portion to spring apart, when fed by its extension from a telescopic sleeve. A disposable receptacle of flexible material having sleeve portions along the opposite sides of its open top is mounted, by sliding the spring arms into the sleeves, so that the top of the receptacle is spread open when the telescopic body portion extends from the sleeve and the arms spring apart.

Likewise, the U.S. Pat. Nos. 3,777,708 to Vogt and No. 3,977,422 to Cabaluna relate to a canine feces disposal mechanism in which the feces do not come in contact with the user and which include a device for holding a litter bag in an open condition for catching dog-egested material and thereby avoiding soiling of the streets and sidewalks.

In spite of the devices disclosed in the above-mentioned patents, particularly the one to Bredt U.S. Pat. No. 3,819,220, there remains a need for a better device, as such devices have significant disadvantages. The Bredt device requires special and expensive waste receptacle bags and in addition, the ends of the spring elements extend beyond the bag and could inflict injury upon the animal.

The Cabaluna device uses an expensive egesting device comprising a gas container in the case on the opposite side of a piston wire mechanism. The Vogt device, like the Bredt device, also requires special waste receptable bags.

SUMMARY OF INVENTION

It is, accordingly, an object of the present invention to overcome deficiencies in the prior art, such as indicated above.

It is a further object to provide for the improved handling of canine generated pet feces.

It is another object of the present invention to provide an improved device for the sanitary and efficienct disposal of animal feces in an inexpensive way.

It is still a further object of the present invention to provide for an animal feces disposal mechanism which uses conventional, inexpensive, disposable bags.

It is yet another object of the present invention to provide for an animal feces disposable mechanism, the spring elements of which do not extend beyond the bag, thus avoiding possible infliction of animal injury.

In accordance with the present invention, there is provided an animal feces disposal device desirably having the general shape of a walking stick or cane, the body of which has a telescopic sleeve covering the working end of the device and a pair of spring arms which are attached to the normally covered body portion at its working end and which spring apart when fed by an extension to the body portion from the sleeve. A conventional bag is clipped onto the spring arms by means of clips on the arms so that the top of the bag is spread open when the sleeve is retracted from the arms and the arms spring apart.

In preparation of an animal excursion, the pet owner retracts the sleeve, attaches the bag to the arm's clips, and retracts the spring arms and attached bag into the sleeve to enclose the bag-wrapped arms therein. When the user's pet appears ready to defecate, the user retracts the sleeve to free the arms which spring apart in order to open the bag for use. The user holds the cane such that the now open bag is beneath the animal's anal area so the pet's feces are caught in the bag. Possible injury to the animal is minimized due to the fact that the spring arms of the device do not extend beyond the bag. When the animal has completed defecation, the user of the device detaches the bag from the clips and then closes the bag tying it for sanitary disposal. The user then retracts the working end of the device within the sleeve to collapse the arms, thereby closing and concealing the twin spring arms within the sleeve.

For a better understanding of the invention, as well as the above and other objects and the nature and advantages of the instant invention, a possible embodiment thereof will now be described with reference to the attached drawings, it being understood that this embodiment is to be intended as merely exemplary and in no way limitative.

DETAILED DESCRIPTION OF ILLUSTRATED EMBODIMENTS

Figure 1:
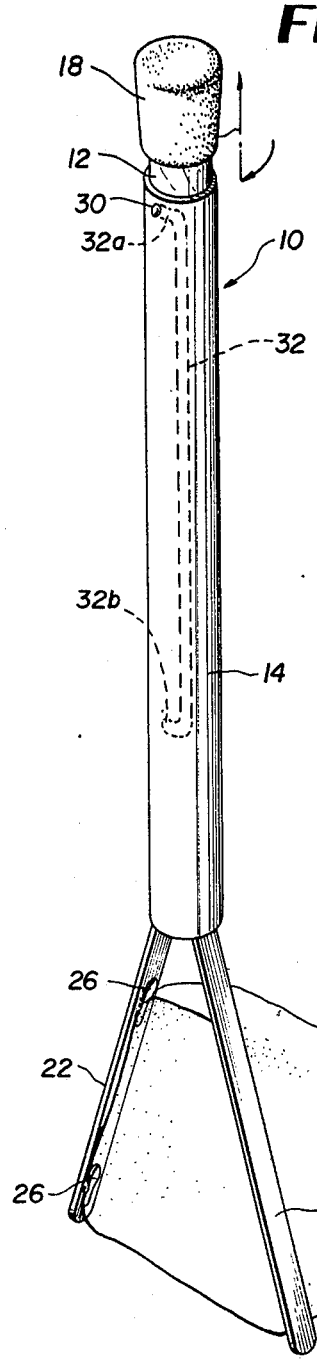
FIG. 1 is a perspective view of a device according to the present invention showing the device in an operative position.

Referring now in detail to the drawings, specifically to FIG. 1, an animal feces disposal device 10 according to the present invention comprises an elongated wand including an inner body portion 12, preferably of cylindrical cross-section and desirably formed of wood, plastic or metal, and an outer tubular sleeve portion 14 desirably formed of plastic or metal, slidable on the lower end of the body portion 12 in a telescoping manner. At its upper end, the inner body portion 12 is provided with a handle 18 of any suitable configuration. At the lower working end 16 of the inner body portion 12, base ends 20 of a pair of spring arms 22 are suitably anchored in position such as by a pair of diametrically disposed rivets 24 or bolts extending through the base ends 20 of the spring arms 22 and the lower end 16 of the body portion 12, although it will be understood that other anchoring means may be used. The spring arms 22 are formed of spring steel or of flexible plastic having a good memory, e.g. polypropylene, and in their normal, unstressed condition, these relatively straight spring arms 22 extend outwardly as shown in FIG. 1. However, in the normal closed position of the device 10 as shown in FIG. 2, the spring arms 22 are compressed together and retained by the outer sleeve 14 when the arms 22 are retracted within the sleeve 14.

Figure 2:
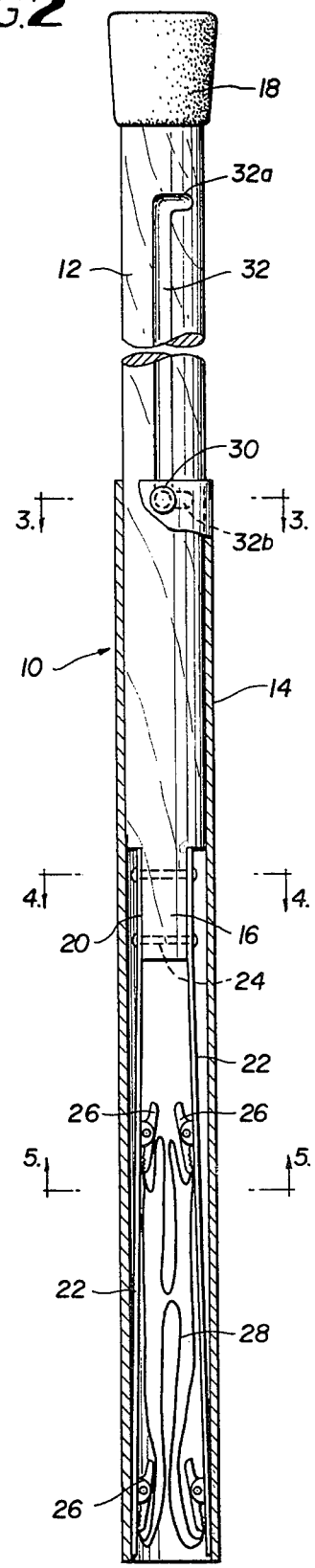
FIG. 2 is a schematic, partial sectional view of the device of FIG. 1 in the retracted position.
Figure 3:
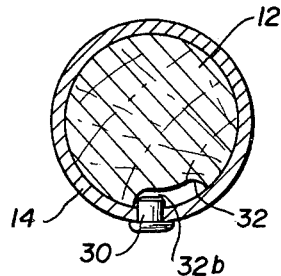
FIG. 3 is a cross-sectional view substantially taken along line 3—3 of FIG. 2.
Figure 4:
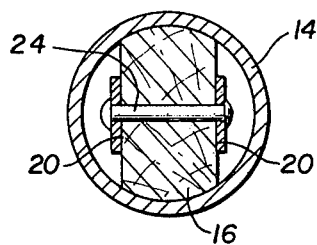
FIG. 4 is a cross-sectional view of the device substantially taken along line 4—4 of FIG. 2.
Figure 5:
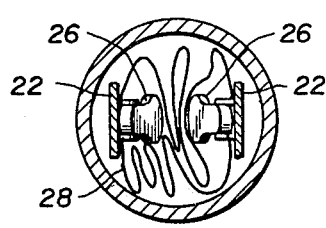
FIG. 5 is a cross-sectional view of the device substantially taken along line 5—5 of FIG. 2.

A pair of spring clips 26 capable of functioning as indicated below are located along each spring arm 22, preferably along the inside surface as shown in FIGS. 1, 2 and 5. These clips must be capable of having a conventional plastic bag 28 clipped thereby and held in place. In the illustrated embodiment, the clips 26 are metal spring clips welded to the steel spring arms 22, although it will be understood that integral, unitary clips may extend from the body of the spring arms 22, particularly when these are made of plastic.

As shown in FIG. 1 and perhaps more readily revealed in FIG. 2, the outer sleeve 14 is provided with an inwardly projecting stud 30 which extends into a bayonet slot 32 in the inner body portion 12 to limit telescopic movement of the sleeve 14 along the body portion 12. It is seen that the slot 32 has laterally extending branches 32a and 32b at its upper and lower ends to secure the body portion 12 when extended and when retracted. While in the illustrated embodiment the groove 32 and stud 30 are respectively located on the body 12 and sleeve 14, and this is preferred for safety purposes, the locations may be reversed.

In operation, the sleeve 14 is slid upwardly on the body portion 12 from the position of FIG. 2 to the position of FIG. 1 to extend and expose the arms 22 whereupon the arms 22 spring apart. Thereupon a bag 28 is attached to the spring arms 22 by the clips 26. When the bag 28 is securely attached as shown in FIG. 1, the arms 22 are compressed towards each other by moving the sleeve 14 downwardly to the maximum amount as regulated by the slot 32 and stud 30 such that the arms 22 and bag 28 become retracted and fully enclosed within the sleeve 14 as FIG. 2 illustrates.

When the user's pet is ready to defecate, the user retracts sleeve 14 in order to enable the arms 22 to spring apart and open the attached bag 28. The user then places the mouth of the bag 28 under the dog such that the pet's discharged feces falls into the bag. There is minimal chance of injury to the pet because the spring arms 22 do not extend beyond the bag 28. It is seen that one clip 26 on each arm is located at or near the termination point of each arm 22.

When the user's pet has finished defecating, the user merely detaches the bag 28 from clips 26 and disposes the bag in a nearby trash receptacle. The user then retracts the arms 22 within the sleeve 14 such that the arms 22 are once again fully enclosed within the sleeve. The whole operation has been performed without the feces coming in contact with the street or sidewalk or with any part of the device itself.

From the foregoing description, it can be seen that simple, efficient and economical means are provided for accomplishing all of the objects and advantages of the invention. It is understood that the invention is not limited to the illustrated embodiments.

A particular advantage of the invention over all known prior art of this type involves the use of conventional disposable plastic or other appropriate type bags as a receptacle for the animal's feces.

Another advantage of the invention involves the construction of the spring arms in which placement of the bag clips eliminates extension of spring elements beyond the bag, preventing injury to the animal when used.

The foregoing description of a specific embodiment will so fully reveal the general nature of the invention that others can, by applying current knowledge, readily modify and/or adapt for various applications such specific embodiment without departing from the generic concept, and, therefore, such adaptations and modifications should and are intended to be comprehended within the meaning and range of equivalents of the disclosed embodiment. It is to be understood that the phraseology or terminology employed herein is for the purpose of description and not of limitation.

What is claimed is:

1. An animal feces disposal device comprising:
   a wand including an elongated body portion having an upper and lower end, and a sleeve telescopically mounted to extend over the lower end of said elongated body portion;
   a pair of substantially straight spring arms carried by the lower end of said body portion, normally tending to spread apart, but retained in a close juxtaposition by the sleeve prior to extension of said arms from said sleeve; and
   a pair of clip means on each of said arms for attachment of a disposable bag of plastic or the like material and whereby said spring arms open the top of the disposable bag when said arms are extended from said sleeve, a said clip means on said spring arm being located at or near the end of said spring arm whereby said spring arms do not extend substantially beyond the attached disposable bag, said clip means being located along the inner surface of each said spring arm.

2. A device according to claim 1, wherein said sleeve has an inwardly projecting stud and said body portion has a mating groove therein.

3. A device according to claim 2, wherein said mating groove has upper and lower horizontal branches.

4. A device according to claim 1, wherein said clip means each comprise a spring clip.

* * * * *